US010514268B2

(12) United States Patent
Yamaguchi et al.

(10) Patent No.: US 10,514,268 B2
(45) Date of Patent: Dec. 24, 2019

(54) SEARCH SYSTEM

(71) Applicant: Clarion Co., Ltd., Saitama-shi, Saitama (JP)

(72) Inventors: Takashi Yamaguchi, Saitama (JP); Susumu Kojima, Saitama (JP)

(73) Assignee: Clarion Co., Ltd., Saitama (JP)

( * ) Notice: Subject to any disclaimer, the term of this patent is extended or adjusted under 35 U.S.C. 154(b) by 238 days.

(21) Appl. No.: 15/516,868

(22) PCT Filed: Sep. 15, 2015

(86) PCT No.: PCT/JP2015/076148
§ 371 (c)(1),
(2) Date: Apr. 4, 2017

(87) PCT Pub. No.: WO2016/056358
PCT Pub. Date: Apr. 14, 2016

(65) Prior Publication Data
US 2017/0299399 A1    Oct. 19, 2017

(30) Foreign Application Priority Data
Oct. 10, 2014  (JP) ................................ 2014-209190

(51) Int. Cl.
*G01C 21/36*    (2006.01)
*G06F 16/33*    (2019.01)
(Continued)

(52) U.S. Cl.
CPC ..... *G01C 21/3608* (2013.01); *G01C 21/3476* (2013.01); *G01C 21/3611* (2013.01);
(Continued)

(58) Field of Classification Search
CPC ............ G01C 21/3608; G01C 21/3611; G01C 21/3617; G01C 21/3476; G01C 21/3679;
(Continued)

(56) References Cited

U.S. PATENT DOCUMENTS

2005/0043949 A1\* 2/2005 Roth .................. G10L 15/14
704/251
2006/0074661 A1\* 4/2006 Takaichi ............. G10L 15/22
704/252
(Continued)

FOREIGN PATENT DOCUMENTS

CN    101939740 A    1/2011
CN    102270213 A    12/2011
(Continued)

OTHER PUBLICATIONS

European Search Report dated Feb. 12, 2018 regarding European Patent Application No. 15848858.5 corresponding to U.S. Appl. No. 15/516,868 (8 pages).

(Continued)

*Primary Examiner* — Jason Holloway
(74) *Attorney, Agent, or Firm* — Lewis Roca Rothgerber Christie LLP

(57) ABSTRACT

An in-vehicle terminal sends a speech input from a voice input unit as a voice signal to a relay server using a short-range wireless communication unit. The relay server converts the voice data received from the in-vehicle terminal into a string with a voice recognition unit, and makes an inquiry, via a communication unit, to an address database of a database server as to whether the string is a geographical condition. If the string converted by the voice recognition unit is a geographical condition based on the inquiry result of the communication unit, a POI data base is searched based on the geographical condition and a stored non-geographical condition, and the geographical condition is stored in a search history. If the string is a non-geographical condition, the POI database is searched based on the non-geographical condition and the geographical condition stored in the search history, and the non-geographical condition is stored in the search history.

6 Claims, 11 Drawing Sheets

(51) Int. Cl.
- G01C 21/34 (2006.01)
- G10L 15/08 (2006.01)
- G10L 15/22 (2006.01)
- G10L 15/26 (2006.01)

(52) U.S. Cl.
CPC ..... G01C 21/3617 (2013.01); G01C 21/3679 (2013.01); G06F 16/334 (2019.01); G10L 15/08 (2013.01); G10L 15/22 (2013.01); G10L 15/265 (2013.01); *G10L 2015/088* (2013.01)

(58) Field of Classification Search
CPC ....... G06F 16/00; G06F 16/334; G10L 15/08; G10L 15/22; G10L 15/265; G10L 15/00; G10L 2015/088

See application file for complete search history.

(56) References Cited

U.S. PATENT DOCUMENTS

| | | | |
|---|---|---|---|
| 2008/0221891 A1 | 9/2008 | Konig et al. | |
| 2009/0150156 A1 | 6/2009 | Kennewick et al. | |
| 2009/0234847 A1* | 9/2009 | Homma | G01C 21/3611 |
| 2009/0271400 A1* | 10/2009 | Uchida | G01C 21/32 |
| 2009/0327263 A1* | 12/2009 | Maghoul | G06F 16/3329 |
| 2011/0196605 A1 | 8/2011 | Severson | |
| 2013/0211710 A1* | 8/2013 | Kennewick | G06Q 30/0261 |
| | | | 701/419 |
| 2014/0280076 A1* | 9/2014 | Sumizawa | G01C 21/3679 |
| | | | 707/722 |
| 2016/0273933 A1* | 9/2016 | Slusar | G01C 21/3608 |

FOREIGN PATENT DOCUMENTS

| | | |
|---|---|---|
| JP | 2001-249933 A | 9/2001 |
| JP | 2005-309666 A | 11/2005 |
| JP | 2014-106927 A | 6/2014 |

OTHER PUBLICATIONS

International Search Report corresponding to PCT/JP2015/076148, dated Dec. 15, 2015, 8 pages.

Chinese Office Action dated Aug. 22, 2019 regarding Chinese Patent Application No. 201580054440.8 corresponding to U.S. Appl. No. 15/516,868 (8 pages) with English Translation (9 pages).

* cited by examiner

FIG.2

| TERMINAL ID | SEARCH KEYWORD | | UPDATE TIME |
| --- | --- | --- | --- |
| | GEOGRAPHICAL CONDITION | NON-GEOGRAPHICAL CONDITION | |
| 1001 | NEAR CURRENT LOCATION | RESTAURANT | 14:10 |
| 1002 | E CITY | MOVIE THEATER | 14:18 |
| 1003 | F CITY | CAFE | 13:45 |

| |
| --- |
| A PREFECTURE, B CITY |
| A PREFECTURE, C CITY |
| A PREFECTURE, D CITY |
| C PREFECTURE, D CITY |
| C PREFECTURE, F CITY |
| C PREFECTURE, G CITY |

| FACILITY NAME | XX RESTAURANT |
|---|---|
| FACILITY CLASSIFICATION | RESTAURANT |
| LATITUDE/LONGITUDE | △△△△、◇◇◇◇ |
| STORE HOURS | 10:00〜19:00 |
| PHONE NUMBER | ○○−○○○−○○○○ |
| ADDRESS | A PREFECTURE,B CITY,○TOWN 123-4 |
| REPUTATION | 4.5 |

| FACILITY NAME | YY MOVIE THEATER |
|---|---|
| FACILITY CLASSIFICATION | MOVIE THEATER |
| LATITUDE/LONGITUDE | △△△△、◇◇◇◇ |
| PHONE NUMBER | XX−XXX−XXXX |
| ADDRESS | C PREFECTURE, D CITY, □ TOWN 5-6-7 |
| PARKING | AVAILABLE |

| FACILITY NAME | ZZ DEPARTMENT STORE |
|---|---|
| FACILITY CLASSIFICATION | DEPARTMENT STORE |
| LATITUDE/LONGITUDE | XXX、◇◇△△ |
| ADDRESS | C PREFECTURE, F CITY, △ TOWN 89 |
| STORE HOURS | OPEN 24 HOURS |

TIME ↓

| SPOKEN WORD | SEARCH KEYWORD | |
|---|---|---|
| | GEOGRAPHICAL CONDITION | NON-GEOGRAPHICAL CONDITION |
| RESTAURANT | NEAR CURRENT LOCATION | RESTAURANT |
| ○ CITY | ○ CITY | RESTAURANT |
| CONVENIENCE STORE | ○ CITY | CONVENIENCE STORE |
| MOVIE THEATER | ○ CITY | MOVIE THEATER |
| △ CITY | △ CITY | MOVIE THEATER |

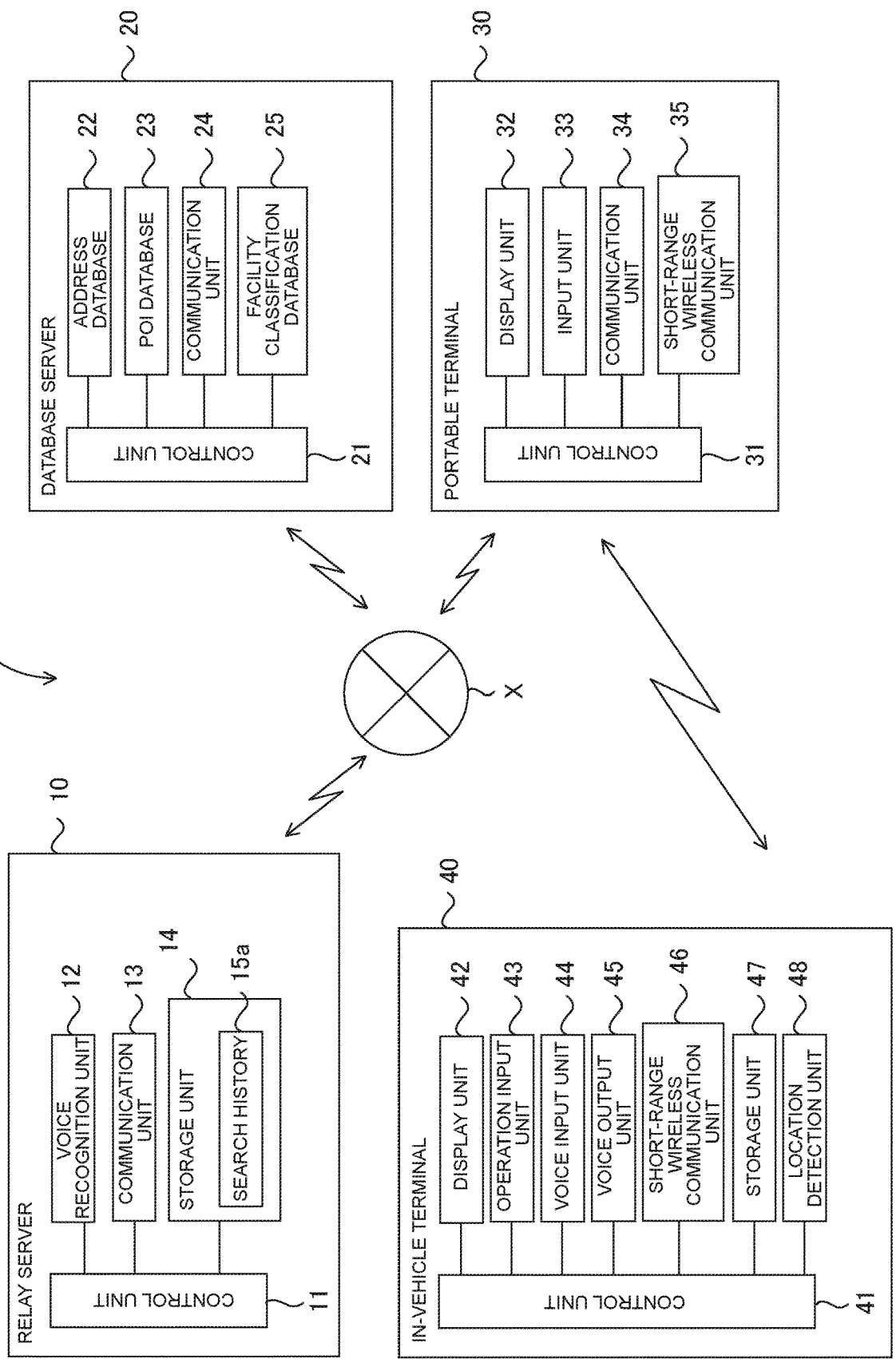

| TERMINAL ID | SEARCH KEYWORD | | | UPDATE TIME |
|---|---|---|---|---|
| | GEOGRAPHICAL CONDITION | FACILITY CLASSIFICATION | FACILITY ATTRIBUTE | |
| 1001 | NEAR CURRENT LOCATION | RESTAURANT | PARKING AVAILABLE | 14:20 |
| 1002 | ○ STATION | MOVIE THEATER | SPACIOUS | 14:35 |
| 1003 | △ STATION | CAFE | QUITE | 13:45 |

| |
|---|
| RESTAURANT |
| MOVIE THEATER |
| CAFE |
| HOTEL |
| DEPARTMENT STORE |
| CONVENIENCE STORE |
| AMUSEMENT PARK |

FIG.12

TIME ↓

| SPOKEN WORD | SEARCH KEYWORD | | |
|---|---|---|---|
| | GEOGRAPHICAL CONDITION | FACILITY CLASSIFICATION | FACILITY ATTRIBUTE |
| RESTAURANT | NEAR CURRENT LOCATION | RESTAURANT | <NONE> |
| ○CITY | ○CITY | RESTAURANT | <NONE> |
| OPEN 24 HOURS | ○CITY | RESTAURANT | OPEN 24 HOURS |
| PARKING AVAILABLE | ○CITY | RESTAURANT | PARKING AVAILABLE |
| △CITY | △CITY | RESTAURANT | PARKING AVAILABLE |
| CONVENIENCE STORE | △CITY | CONVENIENCE STORE | PARKING AVAILABLE |

FIG.15

| SPOKEN WORD | SEARCH KEYWORD | | | | | | |
|---|---|---|---|---|---|---|---|
| | GEOGRAPHICAL CONDITION | FACILITY CLASSIFICATION | STORE HOURS | PARKING | STORE HOLIDAY | NON-SMOKING | CREDIT CARD |
| RESTAURANT | NEAR CURRENT LOCATION | RESTAURANT | — | — | — | — | — |
| ○ CITY | ○ CITY | RESTAURANT | — | — | — | — | — |
| PARKING AVAILABLE | ○ CITY | RESTAURANT | — | AVAILABLE | — | — | — |
| SMOKE-FREE | ○ CITY | RESTAURANT | — | AVAILABLE | — | SMOKE-FREE | — |
| CREDIT CARD ACCEPTED | ○ CITY | RESTAURANT | — | AVAILABLE | — | SMOKE-FREE | ACCEPTED |
| OPEN EVERY DAY | ○ CITY | RESTAURANT | — | AVAILABLE | NONE | SMOKE-FREE | ACCEPTED |
| IGNORE PARKING | ○ CITY | RESTAURANT | — | — | NONE | SMOKE-FREE | ACCEPTED |
| OPEN 24 HOURS | ○ CITY | RESTAURANT | OPEN 24 HOURS | — | NONE | SMOKE-FREE | ACCEPTED |
| CAFE | ○ CITY | CAFE | OPEN 24 HOURS | — | NONE | SMOKE-FREE | ACCEPTED |
| NON-SMOKING SECTION | ○ CITY | CAFE | OPEN 24 HOURS | — | NONE | NON-SMOKING SECTION | ACCEPTED |

TIME →

SEARCH SYSTEM

CROSS-REFERENCE TO RELATED APPLICATION(S)

This application is a national stage of International Application No. PCT/JP2015/076148, filed Sep. 15, 2015, entitled "SEARCH SYSTEM," which claims the benefit of priority from Japanese Patent Application No. JP 2014-209190, filed Oct. 10, 2014, in Japan. The contents of the prior applications are expressly incorporated herein by reference in their entireties.

TECHNICAL FIELD

The present invention relates to a search system configured from a database server, an in-vehicle terminal, and a relay server.

BACKGROUND ART

A device which performs a POI search by inputting keywords via text or voice is known. An invention which supports a user in editing the previous search conditions and creating new search conditions on a GUI screen is disclosed in PTL 1.

CITATION LIST

Patent Literature

Patent Literature (PTL) 1: Japanese Patent Application Laid-open No. 2005-309666

SUMMARY OF THE INVENTION

Problems to be Solved by the Invention

With the invention described in PTL 1, the user is required to edit the search conditions while viewing the screen.

Means to Solve the Problems

According to the first mode of the present invention, provided is a search system including a database server comprising an address database and a POI database, an in-vehicle terminal comprising a voice input unit, and a relay server which sends and receives various data by performing communication between the database server and the in-vehicle terminal, wherein the relay server comprises: a voice recognition unit which converts a voice of a speech input to the voice input unit of the in-vehicle terminal into a string; a storage unit which stores a search keyword indicating a geographical condition (this is hereinafter referred to as a "geographical keyword") and a search keyword indicating a non-geographical condition (this is hereinafter referred to as a "non-geographical keyword"); and a control unit which searches the POI database by using a combination of the geographical keyword and the non-geographical keyword, and sends a search result to the in-vehicle terminal, wherein, in a state where the geographical keyword and the non-geographical keyword are stored in the storage unit, the control unit of the relay server searches the address database and determines whether or not the string converted by the voice recognition unit is a geographical condition and, upon determining that the string is a geographical condition, searches the POI database based on the string and the stored non-geographical keyword and stores the string as the geographical keyword in the storage unit, and, upon determining that the string is not a geographical condition, searches the POI database based on the string and the stored geographical keyword and stores the string as the non-geographical keyword in the storage unit.

According to the second mode of the present invention, in the search system of the first mode, preferably, the in-vehicle terminal further comprises a location detection unit which calculates a current location, and, upon storing the geographical keyword in the storage unit and storing the non-geographical keyword in the storage unit, the control unit of the relay server stores a time of storage as a last recording time in the storage unit, and, when the last recording time is earlier than a current time by a predetermined time or longer in cases of using the geographical condition stored in the storage unit for searching the POI database, uses the current location received from the in-vehicle terminal as the geographical keyword in substitute for the geographical keyword stored in the storage unit.

According to the third mode of the present invention, in the search system of the first mode or the second mode, preferably, the non-geographical keyword is configured from a search keyword indicating a facility classification condition (this is hereinafter referred to as a "classification keyword") and a search keyword indicating a facility attribute condition (this is hereinafter referred to as a "attribute keyword"), when the control unit of the relay server determines that the string is not a geographical condition based on the search result of the address database, the control unit searches the POI database and determines whether the string corresponds to either a facility classification or a facility attribute, in cases where the geographical keyword, the classification keyword, and the attribute keyword are stored in the storage unit, when the control unit determines that the string is the facility classification, the control unit searches the POI database based on the string, the stored geographical keyword, and the stored attribute keyword and stores the string as the classification keyword in the storage unit, and when the control unit determines that the string is the facility attribute, the control unit searches the POI database based on the string, the stored geographical keyword, and the stored classification keyword and stores the string as the attribute keyword in the storage unit.

According to the fourth mode of the present invention, in the search system of any one of the first to third modes, preferably, when the control unit of the relay server determines that the string is a geographical condition in conducting the search of the address database and corresponds to one of the plurality of geographical keywords, the control unit sends the plurality of geographical keywords to the in-vehicle terminal and receives one of the plurality of geographical keywords from the in-vehicle terminal, and searches the POI database based on the received geographical condition and the stored non-geographical keyword and stores the received geographical keyword in the storage unit.

According to the fifth mode of the present invention, in the search system of the first mode or the second mode, preferably, upon storing the geographical keyword stored in the storage unit, the geographical keyword previously stored in the storage unit is deleted, and, upon storing the non-geographical keyword in the storage unit, the non-geographical keyword previously stored in the storage unit is deleted.

According to the sixth mode of the present invention, in the search system of the third mode, preferably, upon storing the geographical keyword stored in the storage unit, the geographical keyword previously stored in the storage unit is deleted, and, upon storing the classification keyword in the storage unit, the classification keyword previously stored in the storage unit is deleted, and, upon storing the attribute keyword in the storage unit, the attribute keyword previously stored in the storage unit is deleted.

Advantageous Effects of the Invention

According to the present invention, the user is not required to edit the search conditions while viewing the screen.

BRIEF DESCRIPTION OF DRAWINGS

FIG. 2 is a diagram showing an example of a search history.

FIG. 3 is a diagram showing an example of an address database.

FIG. 4 is a diagram showing an example of a POI database.

FIG. 5 is a transition diagram of the user's speech and the search keywords used for the search.

FIG. 9 is a block diagram showing a configuration of a search system in the second embodiment.

FIG. 10 is a diagram showing an example of a search history in the second embodiment.

FIG. 11 is a diagram showing an example of a facility classification database.

FIG. 12 is a transition diagram of the user's speech and the search keywords used for the search in the second embodiment.

FIG. 15 is a transition diagram of the user's speech and the search keywords used for the search in modified example 1.

DESCRIPTION OF EMBODIMENTS

Embodiments

The search system according to the present invention is now explained with reference to FIG. 1 to FIG. 8.

Figure 1:
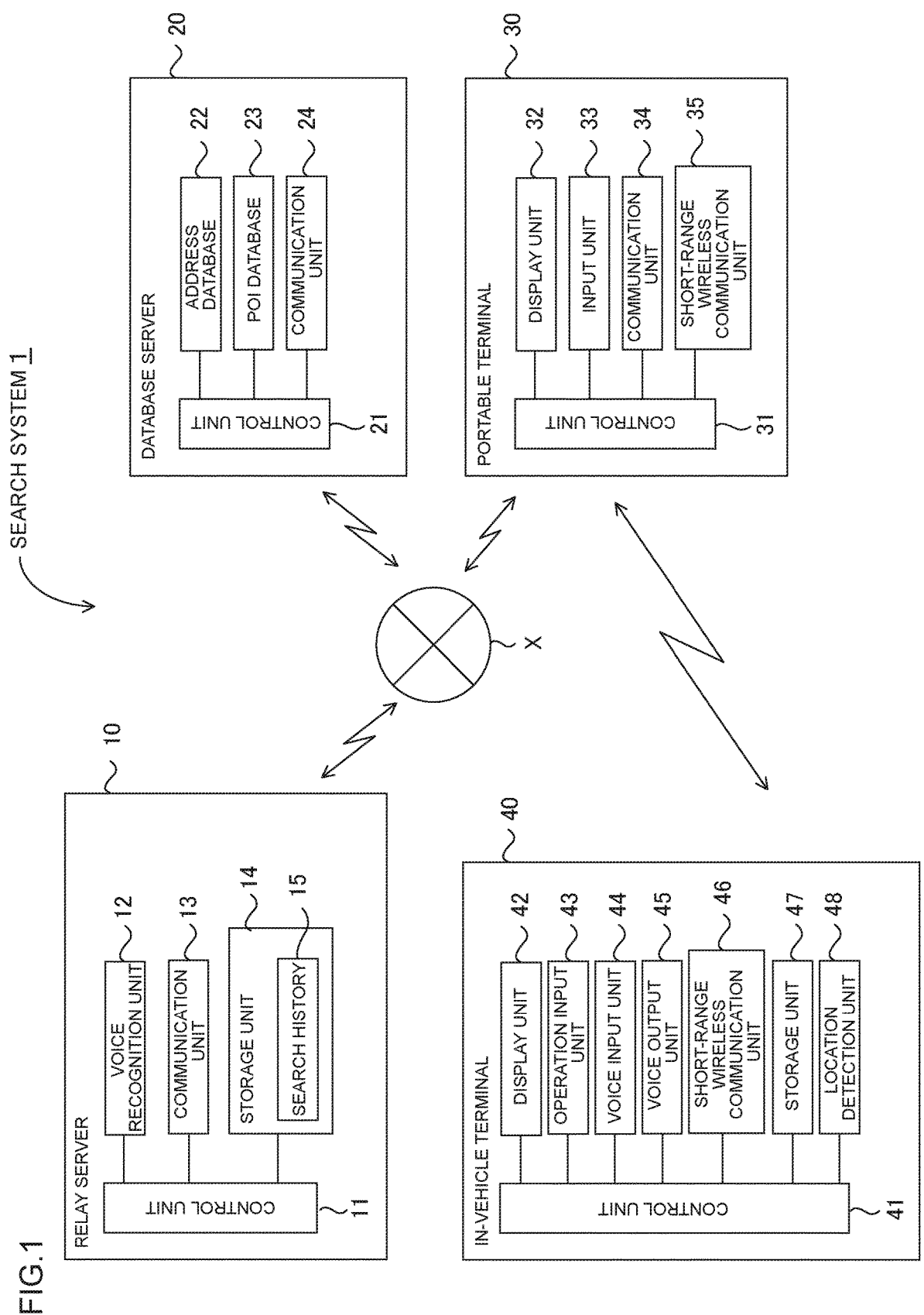
FIG. 1 is a block diagram showing a configuration of a search system in the first embodiment.

FIG. 1 is a block diagram showing a configuration of the search system 1. The search system 1 is configured from a relay server 10, a database server 20, a portable terminal 30, and an in-vehicle terminal 40. The relay server 10, the database server 20, and the portable terminal 30 are connected via a public network X. The in-vehicle terminal 40 is connected to the portable terminal 30 via short-range wireless communication, and the in-vehicle terminal 40 can communicate with the relay server 10 via the portable terminal 30. The portable terminal 30 and the in-vehicle terminal 40 are owned and operated by the same person, and such person is referred to as the "user" in this description.

The relay server 10 comprises a control unit 11, a voice recognition unit 12, a communication unit 13, and a storage unit 14.

The control unit 11 comprises a CPU, a ROM, and a RAM (all not shown), store the programs described later in the ROM, and execute the programs by reading them into the RAM. The control unit 11 is connected to the voice recognition unit 12, the communication unit 13, and the storage unit 14 via a signal line. When the control unit 11 receives voice data and location information from the in-vehicle terminal 40 via the portable terminal 30, the control unit 11 uses the voice recognition unit 12 to convert the voice data into text data. Subsequently, the control unit 11 searches the database server 20 by communicating with the database server 20 based on the processing described later, and causes the communication unit 13 to send the search result to the in-vehicle terminal 40 via the portable terminal 30. At least a string and a search mode are sent to the database server 20. The search mode is either an address search or a POI search.

The voice recognition unit 12 is an ASIC which converts the voice data input from the control unit 11 into text data, and outputs the text data to the control unit 11.

The communication unit 13 communicates with the database server 20 and the portable terminal 30. Moreover, since the portable terminal 30 communicates with the in-vehicle terminal 40 via short-range wireless communication, the communication unit 13 can communicate with the in-vehicle terminal 40 via the portable terminal 30. While FIG. 1 only illustrates one portable terminal 30 and one in-vehicle terminal 40, the communication unit 13 can communicate with a plurality of portable terminals 30 and in-vehicle terminals 40.

The storage unit 14 is configured from a magnetic disk, and a memory area 15 for storing a search history is set in the storage unit 14. The search history memory area 15 stores a geographical keyword, a non-geographical keyword, and an update time which were used in the previous search for each in-vehicle terminal 40. In the ensuing explanation, the search history itself stored in the memory area 15 is represented with reference numeral 15. When the current time has elapsed from the update time by a predetermined time or longer, the geographical keyword and the non-geographical keyword are deemed as not being stored. The relay server 10 rewrites a part or all of the search history 15 prior to conducting the POI search, and conducts the POI search using the information indicated in the search history 15.

FIG. 2 is a diagram showing an example of the search history 15. FIG. 2 shows the search keywords and the update time of three in-vehicle terminals 40 having an in-vehicle terminal ID of 1001 to 1003. For instance, when the current time is 14:30 and when the predetermined time considered as the series of searches is 30 minutes, since the search by the in-vehicle terminals 40 having an ID of 1001 and 1002 was conducted less than 30 minutes from the update time, the search keywords of the search history 15 are referenced. Nevertheless, since the search by the in-vehicle terminal 40 having an ID of 1003 was conducted after the lapse of 30 minutes or longer from the update time, the search keywords of the search history 15 are deemed as not being stored.

The database server 20 comprises a control unit 21, an address database 22, a POI database 23, and a communication unit 24.

The control unit 21 comprises a CPU, a ROM, and a RAM (all not shown). The data received from the relay server 10 includes at least a string and a search mode, the POI database 23 or the address database 22 is searched based on the received search mode, and the search result is sent from the communication unit 24 to the relay server 10. Nevertheless, when there is no hit in the search of the database based on the received string, "Not applicable" is sent to the relay server 10.

The address database 22 is configured from a magnetic disk (not shown), and the address database 22 stores address data. FIG. 3 shows an example of the address data stored in the address database 22, and a list of geographical keywords expressed with prefectures and cities is stored. In this description, this geographical keyword is indicated as an address. When the search mode included in the data received from the relay server 10 is an address search, the control unit 21 of the database server 20 searches the address database 22 using the received string, and sends the search result via the communication unit 24. While this will be described in detail later, for instance, in a case where the address database 22 is the example shown in FIG. 3, when the database server 20 receives a string "D", "A prefecture, D city" and "C prefecture, D city", which are all addresses including "D", are sent to the relay server 10.

The POI database 23 is configured from a magnetic disk (not shown), and the POI database 23 stores a plurality of POI data. One POI data is configured from a facility name, a facility classification, a location; that is, a latitude and a longitude, and one or more facility attributes. The facility classification indicates the classification of the facility; for instance, a restaurant, a movie theater, a department store or the like. The facility attribute is; for instance, store hours, phone number, parking availability, store holiday, non-smoking seating, credit card accepted or the like. FIG. 4 shows an example of the data stored in the POI database 23.

The communication unit 24 communicates with the relay server 10 via the public network X. When the search mode included in the data received from the relay server 10 is a POI search, the POI database 23 is searched using the received string, and the search result is sent via the communication unit 24.

The portable terminal 30 is a mobile phone or the like, and comprises a control unit 31, a display unit 32, an input unit 33, a communication unit 34, and a short-range wireless communication unit 35.

The control unit 31 comprises a CPU, a ROM, and a RAM (all not shown), and has a function of relaying the communication between the in-vehicle terminal 40 and the relay server 10 (this is hereinafter referred to as the "tethering function") by using the communication unit 34 and the short-range wireless communication unit 35 in accordance with the user's instructions given using the input unit 33. Thus, when the tethering function of the portable terminal 30 is active, the in-vehicle terminal 40 can perform processing as though it is directly communicating with the relay server 10.

The display unit 32 comprises a liquid crystal display (not shown), and displays data according to the instructions from the control unit 31.

The input unit 33 comprises a button (not shown), and conveys the user's input; for instance, the activation or the deactivation of the tethering function, to the control unit 31.

The communication unit 34 comprises an antenna and a communication module (both not shown), and communicates with the relay server 10 via the public network X.

The short-range wireless communication unit 35 comprises an antenna and a communication module (both not shown), and communicates with the in-vehicle terminal 40. For example, for this short-range wireless communication, Bluetooth (registered trademark) or a wireless LAN may be used.

The in-vehicle terminal 40 is a tablet terminal or the like, and comprises a control unit 41, a display unit 42, an operation input unit 43, a voice input unit 44, a voice output unit 45, a short-range wireless communication unit 46, a storage unit 47, and a location detection unit 48. The in-vehicle terminal 40 may be used by being fixed within the vehicle, but may also be removed and used outside the vehicle.

The control unit 41 comprises a CPU, a ROM, and a RAM (all not shown), store the programs described later in the ROM, and execute the programs by reading them into the RAM. When a voice input start signal is input from the operation input unit 43, the control unit 41 instructs the voice input unit 44 to input voices for a prescribed period, and sends, to the relay server 10, the digital data output by the voice input unit 44, the in-vehicle terminal ID, and the latitude/longitude output by the location detection unit 48. When the control unit 41 receives the search result from the relay server 10, the control unit 41 uses the display unit 42 and the voice output unit 45 to output the information, and instructs the voice input unit 44 to input voices for a prescribed period in preparation for the subsequent search by the user through speech.

The display unit 42 comprises a liquid crystal display (not shown), and displays data according to instructions from the control unit 41.

The operation input unit 43 comprises a plurality of buttons (not shown), and conveys, to the control unit 41, the movement of the cursor by the user to select an item, the selection of the selected item, and the start of voice input.

The voice input unit 44 comprises a microphone and an AD converter (both not shown), and converts the user's spoken voice into digital voice data and outputs the digital voice data to the control unit 41 according to instructions from the control unit 41. When the voice data is input, the control unit 41 uses the short-range wireless communication unit 46 to send, to the relay server 10, the voice data, the in-vehicle terminal ID, and the latitude/longitude output from the location detection unit 48.

The voice output unit 45 comprises a speaker and a DA converter (both not shown), and outputs the digital data, which was output from the control unit 41, as a voice.

The short-range wireless communication unit 46 comprises an antenna and a communication module (both not shown), and communicates with the portable terminal 30. For example, for this short-range wireless communication, Bluetooth (registered trademark) or a wireless LAN may be used. The portable terminal 30 can communicate with the relay server 10 by relaying the communication.

The storage unit 47 is configured from a flash memory (not shown), and the storage unit 47 stores an in-vehicle terminal ID as the identification number of the corresponding in-vehicle terminal 40.

The location detection unit 48 is configured from an antenna and a GPS receiver (both not shown), receives radio waves from a satellite according to instructions from the control unit 41 and calculates the location of the in-vehicle terminal 40; that is, the latitude and the longitude, and outputs the location information to the control unit 41. The location information is sent to the relay server 10 together with the voice data input from the voice input unit 44 and the in-vehicle terminal ID stored in the storage unit 47.

(Operation)

The overview of the operation of the POI search conducted by the relay server 10 according to the present invention is now explained with reference to FIG. 5. While the relay server 10 converts the voice data received from the in-vehicle terminal 40 into a string with the voice recognition unit 12 and sends the search keyword to the database server 20, as explained below, the POI search can be conducted by combining the search keyword with past speeches.

FIG. 5 is a diagram showing the transition of the user's speech and the search keywords sent by the relay server 10 to the database server 20. The search keywords are configured from a geographical keyword and a non-geographical keyword, and are updated based on the user's speech. While this will be described in detail later, whether or not the word spoken by the user is a geographical condition is determined by the control unit 11 of the relay server 10 based on the inquiry result of the inquiry made to the database server 20 based on the address search mode.

In FIG. 5, time is elapsing from top to bottom, and the user's first speech is "Restaurant", and the user's last speech is "Δ city". Since a search had not been conducted for a long period before the user's first speech shown in FIG. 5, even if data in which 30 minutes or longer has elapsed was stored in the search history 15, the search history 15 is not referenced for the search corresponding to the user's first speed shown in FIG. 5. Moreover, the time interval of the respective searches shown in FIG. 5 is short and less than 30 minutes in this example, and consideration is given to the search history 15, which is the search result of the previous search.

When the user foremost speaks the word "Restaurant", the relay server 10 determines that the received data is not a geographical condition, and sends the search keywords to the database server 20 in which the geographical keyword is "Near current location", and the non-geographical keyword is "Restaurant".

When the user subsequently speaks the word "○ city", the relay server 10 determines that the received data is a geographical condition. Subsequently, the relay server 10 sends the search keywords configured from "○ city" as the new geographical keyword, and "Restaurant" as the same non-geographical keyword, to the database server 20.

When the user subsequently speaks the words "Convenience store", the relay server 10 determines that the received data is not a geographical condition. Subsequently, the relay server 10 sends the search keywords configured from "○ city" as the same geographical keyword, and "Convenience store" as the new non-geographical keyword, to the database server 20.

When the user subsequently speaks the words "Movie theater", the relay server 10 determines that the received data is not a geographical condition. Subsequently, the relay server 10 sends the search keywords configured from "○ city" as the same geographical keyword, and "Movie theater" as the new non-geographical keyword, to the database server 20.

When the user subsequently speaks the word "Δ city", the relay server 10 determines that the received data is a geographical condition. Subsequently, the relay server 10 sends the search keywords configured from "Δ city" as the new geographical keyword, and "Movie theater" as the same non-geographical keyword, to the database server 20.

As explained above, the relay server 10 determines whether or not the user's speech is a geographical condition, and conducts the POI search based on a combination of the geographical keyword and the non-geographical keyword.

Note that, in order to determine whether the received data is a geographical condition, the relay server 10 sends a string with the search mode as the address search, and sends the geographical keyword and the non-geographical keyword with the search mode as the POI search for conducting the POI search.

(Flowchart of Relay Server)

The operation of the program to be executed by the control unit 11 of the relay server 10 in the search system 1 described above is now explained.

Figure 6:
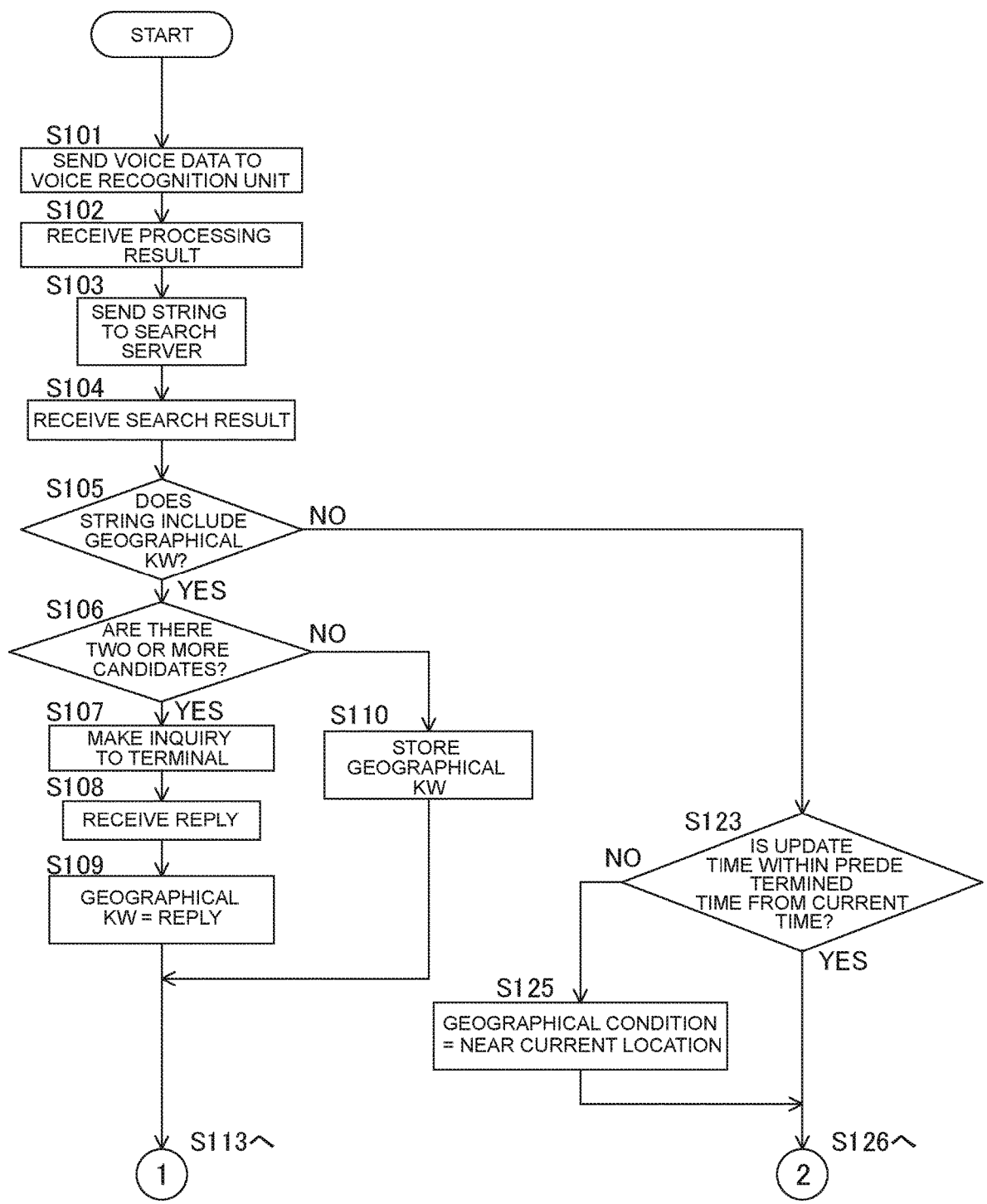
FIG. 6 is a flowchart showing the operation of a program to be executed by a control unit of a relay server.
Figure 7:
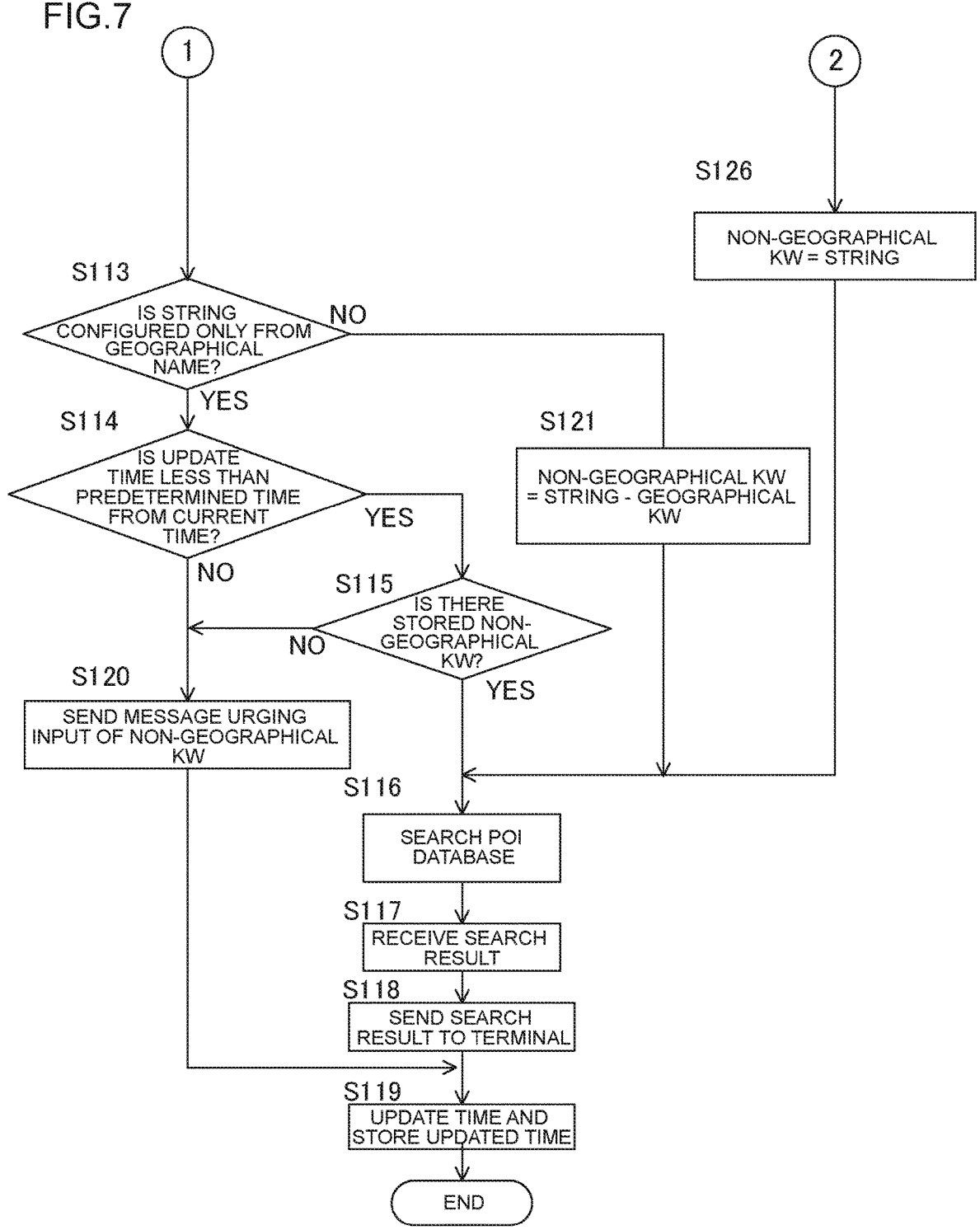
FIG. 7 is the second half of the flowchart illustrated in FIG. 6.

FIG. 6 and FIG. 7 are flowcharts showing the operation of the program to be executed by the control unit 11 of the relay server 10. The control unit 11 executes the program indicated as a flowchart in FIG. 6 each time the communication unit 13 receives a communication from the in-vehicle terminal 40. Since the flowchart shown in FIG. 6 includes numerous processing steps, the second half thereof is shown in FIG. 7.

In step S101, the control unit 11 sends, among the voice data, the in-vehicle terminal ID, and the latitude/longitude received by the communication unit 13, the voice data to the voice recognition unit 12, and then proceeds to step S102.

In step S102, the control unit 11 receives the string, which was converted from the voice data, from the voice recognition unit 12 (this is hereinafter referred to as the "converted string"), and then proceeds to step S103.

In step S103, the control unit 11 sends, to the database server 20, the converted string and a search mode to the effect that it is an address search for searching the address database 22, and then proceeds to step S104.

While this will be explained in detail later, the database server 20 that received the data sent from the relay server 10 in step S103 searches the address database 22 by using the received string, and returns the search result to the relay server 10. The search result to be returned will differ depending on whether the number of hits corresponds to 0, 1, or 2 or more upon searching the address database 22 by using the received string. When the number of hits is 0; that is, when there is nothing applicable in the address database 22, a search result to such effect; for instance, "Not applicable", is returned. When the number of hits is 1; that is, when it is possible to uniquely identify the address based on the received string, a search result to the effect that the address could be identified; for instance, "Uniquely identified", is returned. When the number of hits is 2 or more; that is, when there are a plurality of addresses corresponding to the received string and it is not possible to uniquely identify the address, all corresponding addresses are returned. For example, in cases where the address database 22 is the example shown in FIG. 3 and the received string is "D", "A prefecture, D city" and "C prefecture, D city" are returned.

In step S104, the control unit 11 receives the search result from the database server 20, and then proceeds to step S105.

In step S105, the control unit 11 determines whether or not the converted string includes a geographical keyword based on the search result received in step S104; that is, the control unit 11 determines whether the search result is not "Not applicable", or is "Not applicable". The control unit 11 proceeds to step S106 upon determining that the converted string includes a geographical keyword; that is, when the control unit 11 determines that the search result was not "Not applicable", and proceeds to step S123 upon determining that the converted string does not include a geographical keyword; that is, when the control unit 11 determines that the search result was "Not applicable".

In step S106, the control unit 11 determines whether there is only one geographical keyword candidate, or whether there are two or more geographical keyword candidates. The control unit 11 proceeds to step S110 upon determining that there is only one geographical keyword candidate; that is, when the control unit 11 determines that the received search result is "Uniquely identified", and proceeds to step S107 upon determining that there are two or more geographical keyword candidates; that is, when the control unit 11 determines that the received search result is configured from a plurality of geographical keywords.

In step S107, the control unit 11 sends the plurality of geographical keyword candidates received in step S104 to the in-vehicle terminal 40, and then proceeds to step S108. The control unit 41 of the in-vehicle terminal 40 that received the plurality of geographical keyword candidates displays the plurality of candidates on the display unit 42, and sends the selected geographical keyword to the relay server 10 according to the user's input given from the operation input unit 43.

In step S108, the control unit 11 receives the geographical keyword from the in-vehicle terminal 40, and then proceeds to step S109.

In step S109, the control unit 11 stores the geographical keyword received from the in-vehicle terminal 40 as the geographical keyword of the corresponding in-vehicle terminal ID of the search history 15, and then proceeds to step S113 shown in FIG. 7.

When there is only one geographical keyword candidate, in step S110, the control unit 11 stores the geographical keyword candidate received from the in-vehicle terminal 40 as the geographical keyword of the corresponding in-vehicle terminal ID of the search history 15, and then proceeds to step S113 shown in FIG. 7. If a geographical keyword of the corresponding in-vehicle terminal ID has previously been stored in the search history 15, the control unit 11 deletes the previously stored geographical keyword and stores the newly received geographical keyword. In other words, the control unit 11 overwrites and saves the received geographical keyword.

In step S113, the control unit 11 determines whether the converted string is configured only from a geographical keyword or includes a keyword other than a geographical keyword based on the converted string and the search result received in step S106. The control unit 11 proceeds to step S114 upon determining that the converted string is configured only from a geographical keyword, and proceeds to step S121 upon determining that the converted string includes a keyword other than a geographical keyword.

In step S114, the control unit 11 refers to the update data associated with the corresponding in-vehicle terminal ID of the search history 15 and determines whether the time from the update time to the current time is less than a predetermined time; for instance, less than 30 minutes. The control unit 11 proceeds to step S115 upon determining that the time from the update time to the current time is less than a predetermined time, and proceeds to step S120 upon determining that a predetermined time or longer has elapsed from the update time. Nevertheless, when data of the corresponding in-vehicle terminal ID is not stored in the search history 15, the control unit 11 proceeds to step S120 as with the case where a predetermined time or longer has elapsed from the update time.

In step S115, the control unit 11 determines whether or not a non-geographical keyword of the corresponding in-vehicle terminal ID is stored as the search history 15. The control unit 11 proceeds to step S116 upon determining that a non-geographical keyword is stored, and proceeds to step S120 upon determining that a non-geographical keyword is not stored.

In step S116, the control unit 11 sends the search keywords which are stored by being associated with the corresponding in-vehicle terminal ID of the search history 15; that is, the control unit 11 sends the geographical keyword, the non-geographical keyword, and the search mode to the effect that it is a POI search, to the database server 20 and searches the POI database, and then proceeds to step S117.

In step S117, the control unit 11 receives the search result from the database server 20, and then proceeds to step S118.

In step S118, the control unit 11 sends the search result received in step S117 to the in-vehicle terminal 40 having the corresponding in-vehicle terminal ID, and then proceeds to step S119.

In step S119, the control unit 11 updates the update time of the corresponding in-vehicle terminal ID of the search history 15 to the current time, and then ends the flowchart of FIG. 7.

When the control unit 11 determines that a predetermined time or longer has elapsed from the update time, or determines that a non-geographical keyword is not stored, in step S120, the control unit 11 sends a message to the in-vehicle terminal 40 having the corresponding in-vehicle terminal ID to urge the in-vehicle terminal 40 to input a non-geographical keyword, and then proceeds to step S119.

The control unit 11 proceeds to step S113 to step S121 when the converted string includes a keyword other than a geographical keyword, stores a keyword obtained by removing the geographical keyword from the converted string as the non-geographical keyword which is stored by being associated with the corresponding in-vehicle terminal ID of the search history 15, and then proceeds to step S116. For example, when the converted string is "B, Movie theater" and the geographical keyword of the corresponding in-vehicle terminal ID of the search history 15 is "B", "Movie theater" is stored as the non-geographical keyword. When a non-geographical keyword of the corresponding in-vehicle terminal ID has been previously stored in the search history 15, the control unit 11 deletes the previously stored non-geographical keyword. In other words, control unit 11 overwrites and stores the newly stored non-geographical keyword.

The control unit 11 proceeds to step S105 to step S123 shown in FIG. 6 when the converted string does not include a geographical keyword, refers to the update time which is stored by being associated with the corresponding in-vehicle terminal ID of the search history 15, and determines whether it is less than a predetermined time from the current time. The control unit 11 proceeds to step S126 shown in FIG. 7 upon determining that it is less than a predetermined time from the current time, and proceeds to step S125 upon determining that a predetermined time or longer has elapsed from the current time. Nevertheless, when data of the corresponding in-vehicle terminal ID is not stored in the search history 15, the control unit 11 proceeds to step S125 as with the case where a predetermined time or longer has elapsed from the current time.

In step S125, the control unit 11 stores "Near current location" as the geographical keyword of the corresponding in-vehicle terminal ID of the search history 15, and then proceeds to step S126 shown in FIG. 7.

In step S126 shown in FIG. 7, the control unit 11 stores the converted string as the non-geographical keyword of the corresponding in-vehicle terminal ID of the search history 15, and then proceeds to step S116.

(Flowchart of Database Server)

The program to be executed by the control unit 21 of the database server 20 is now explained.

Figure 8:
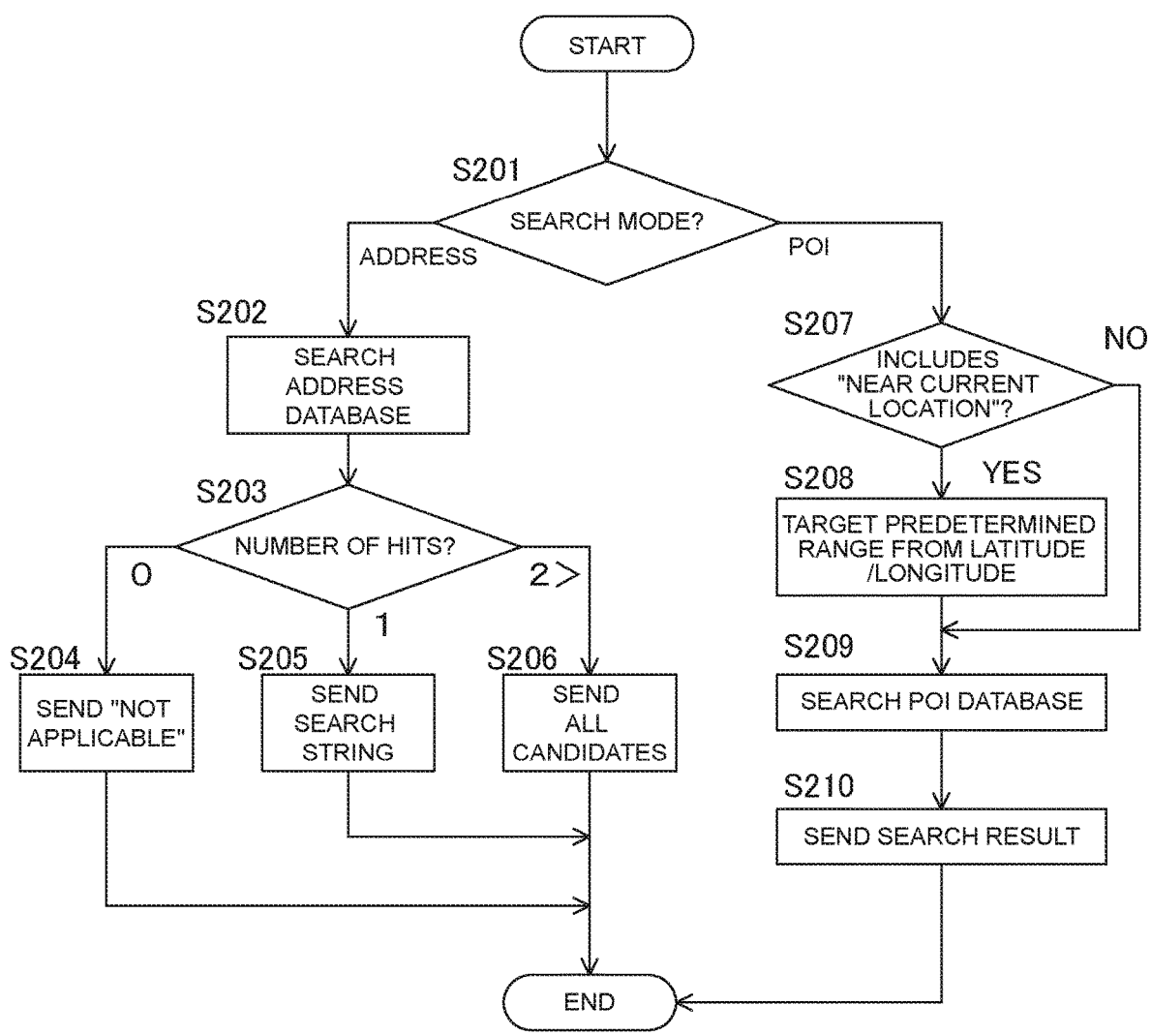
FIG. 8 is a flowchart showing the operation of a program to be executed by a control unit of a database server.

FIG. 8 is a flowchart showing the operation of the program to be executed by the control unit 21 of the database server 20. The control unit 21 executes the program indicated as a flowchart in FIG. 8 each time the communication unit 24 receives a communication from the relay server 10. The data received from the relay server 10 includes search mode information indicating whether the search is an address search or a POI search, and a string is received in the case of an address search, and a string and the latitude/longitude of the current location are received in the case of a POI search.

In step S201, the control unit 21 reads the search mode from the received data, and proceeds to step S202 upon determining that it is an address search, and proceeds to step S207 upon determining that it is a POI search.

In step S202, the control unit 21 searches the address database 22 by using the received string, and then proceeds to step S203.

In step S203, the control unit 21 determines whether the number of corresponding addresses found in the search conducted in step S202 is 0, 1, or 2 or more. The control unit 21 proceeds to step S204 when the number of corresponding addresses is 0, proceeds to step S205 when the number of corresponding addresses is 1, and proceeds to step S206 when the number of corresponding addresses is 2 or more.

For example, in cases where the address database 22 is the example shown in FIG. 3, if the string is "Z", the number of corresponding addresses is 0 since there is no address including "Z", if the string is "B", the number of corresponding addresses is 1 since there is only one address of "A prefecture, B city" including "B", and if the string is "D", the number of corresponding addresses is 2. Nevertheless, if the string is "A", the number of corresponding addresses is 1 since the address can be uniquely identified as being "A prefecture". Moreover, while not shown in FIG. 3, the address database 22 also determines "Near current location" as one type of address.

In step S204, the control unit 21 sends "Not applicable" to the relay server 10, and then ends the flowchart of FIG. 8.

In step S205, the control unit 21 sends the string that was used in the search conducted in step S202; for instance, if the string is "B", the control unit 21 sends "B" to the relay server 10, and then ends the flowchart of FIG. 8.

When the search mode is a POI search, in step S206, the control unit 21 sends all corresponding addresses found in the search conducted in step S202 to the relay server 10, and then ends the flowchart of FIG. 8. For example, in cases where the address database 22 is the example shown in FIG. 3, if the string is "D", "A prefecture, D city" and "C prefecture, D city" are sent to the relay server 10.

The control unit 21 proceeds to step S207 upon determining that the search mode is a POI search in step S201, and determines whether the received string includes "Near current location". The control unit 21 proceeds to step S208 upon determining that the received string includes "Near current location", and proceeds to step S209 upon determining that the received string does not include "Near current location".

In step S208, the control unit 21 sets the search target of the POI search to be within a prescribed range from the received latitude/longitude; for instance, within 1 km, erases "Near current location" from the received string, and then proceeds to step S209.

In step S209, the control unit 21 searches the POI database 23 by using the received string, and then proceeds to step S210.

In step S210, the control unit 21 sends the search result obtained in step S209 to the relay server 10, and then ends the flowchart of FIG. 8.

(Summary of Operations)

In the first embodiment, the search system 1 performs the following operations.

The in-vehicle terminal 40 converts the user's spoken voice into voice data with the voice input unit 44, and sends the voice data to the relay server 10. The relay server 10 converts the received voice data into a string with the voice recognition unit 12, and uses the address database 22 of the database server 20 to determine whether the string is a geographical condition. This is because, by taking note of the fact that the designation of a geographical keyword is important in a POI search, the search is conducted based on a combination of a geographical keyword and a non-geographical keyword. Subsequently, the string is stored in the search history memory area 15 based on the determination of whether or not the string is a geographical condition, and the POI database 23 is searched using the search history 15 configured from a geographical keyword and a non-geographical keyword. When the search result is received from the database server 20, the search result is sent to the in-vehicle terminal 40.

The following effects are yielded according to the embodiment described above.

(1) The search system 1 includes a database server 20 comprising an address database 22 and a POI database 23, an in-vehicle terminal 40 comprising a voice input unit 44, and a relay server 10 which sends and receives various data by performing communication between the database server 20 and the in-vehicle terminal 40. The relay server 10 comprises a voice recognition unit 12 which converts a voice of a speech input to the voice input unit 44 of the in-vehicle terminal 40 into a string, a storage unit 14 which stores a geographical keyword which is a search keyword indicating a geographical condition and a non-geographical keyword which is a search keyword indicating a non-geographical condition, and a control unit 11 which searches the POI database 23 by using a combination of the geographical keyword and the non-geographical keyword, and sends a search result to the in-vehicle terminal 40. In a state where the geographical keyword and the non-geographical keyword are stored in the storage unit 14, the control unit 11 of the relay server 10 searches the address database 22 of the POI database 23 and determines whether or not the string converted by the voice recognition unit 12 is a geographical condition. When the control unit 11 of the relay server 10 determines that the string is a geographical condition, the control unit 11 searches the POI database 23 based on the string and the stored non-geographical keyword and stores the string as the geographical keyword in the storage unit 14. When the control unit 11 of the relay server 10 determines that the string is not a geographical condition, the control unit 11 searches the POI database 23 based on the string and the stored geographical keyword and stores the string as the non-geographical keyword in the storage unit 14.

According to the foregoing search system 1, since the relay server 10 determines whether or not the user's speech is a geographical condition, the user is not required to edit the search condition while viewing the screen, and the POI database 23 can be searched by using the user's conventional speech and the user's new speech. Since whether or not the user's speech is a geographical condition is determined and the POI database is searched based on a combination of a geographical keyword and a non-geographical keyword which were recently spoken by the user, the search can be conducted based on a combination of a geographical keyword and a non-geographical keyword even if the user successively speaks geographical keywords.

(2) The in-vehicle terminal 40 further comprises a location detection unit 48 which calculates the current location. Upon storing the geographical keyword in the storage unit 14 and storing the non-geographical keyword in the storage unit 14, the control unit 11 of the relay server 10 stores a time of storage as a last recording time, or an update time, in the storage unit 14. When the update time is earlier than the current time by a predetermined time or longer in cases of using the geographical condition stored in the storage unit 14 for searching the POI database, the control unit 11 of the relay server 10 uses the current location received from the in-vehicle terminal 40 as the geographical keyword in substitute for the geographical keyword stored in the storage unit 14.

Consequently, when a predetermined time or longer has elapsed from the previous search, processing can be performed as a new search. For example, if the user speaks the words "Convenience store" after 30 minutes or longer has elapsed from a search in which the geographical keyword was "◦ city" and the non-geographical keyword was "Movie theater", it is considered that the user does not intend to use the geographical keyword of "◦ city", which was used in the previous search, for the new search. In the foregoing case, by speculating the user's intention based on the lapse of time, the current location is used as the geographical keyword, rather than using the geographical keyword stored in the search history 15.

(3) When the control unit 11 of the relay server 10 determines that the string corresponds to one of the plurality of geographical keywords in conducting the search of the address database 22, the control unit sends the plurality of geographical keywords to the in-vehicle terminal 40. When the control unit 11 receives one of the geographical keywords from the in-vehicle terminal 40 that received the plurality of geographical keywords, the control unit 11 searches the POI database 23 based on the received geographical keyword and the stored non-geographical keyword and stores the received geographical keyword in the storage unit 14.

Consequently, when it is unclear as to which geographical keyword among the plurality of geographical keywords the user's speech corresponds, by sending the plurality of candidates to the in-vehicle terminal 40 and making an inquiry to the user, the search can be conducted based on the user's reply.

Second Embodiment

The second embodiment of the search system according to the present invention is now explained with reference to FIG. 9 to FIG. 14. In the ensuing explanation, the same constituent elements as the first embodiment are given the same reference numeral, and only the differences will be mainly explained. Points that are not specifically explained are the same as the first embodiment. This embodiment differs from the first embodiment with respect to the point that the non-geographical keyword configuring the search keyword is subdivided into a classification keyword indicating a facility category condition and an attribute keyword indicating a facility attribute condition, and the POI database is searched using three keywords; specifically, a geographical keyword, a classification keyword, and an attribute keyword.

FIG. 9 is a block diagram showing the configuration of the search system 1 in the second embodiment. The configuration of the search system 1 in the second embodiment differs from the first embodiment with respect to the point that the format of the search history 15*a* stored in the storage unit 14 of the relay server 10 differs from the first embodiment, and the point that the database server 20 further comprises a facility classification database 25.

The search history 15*a* stored in the storage unit 14 of the relay server 10 stores a geographical keyword, a classification keyword, an attribute keyword, and an update time which were used in the search for each in-vehicle terminal 40.

FIG. 10 is a diagram showing an example of the search history 15*a*. The relay server 10 conducts a POI search based on a combination of a geographical keyword, a classification keyword and an attribute keyword. The in-vehicle terminal ID which identifies the in-vehicle terminal 40, and the geographical keyword, the classification keyword, and the attribute keyword used in the search, are stored in the search history memory area 15*a*. Moreover, when the current search is conducted within a predetermined time from the previous search, this is deemed to be a series of ongoing searches, and the search history 15*a* is referenced. The search history memory area 15*a* additionally stores the update time.

The facility classification database 25 of the database server 20 stores the classification of the facility used in the POI search. FIG. 11 is a diagram showing an example of the facility classification database 25.

In the second embodiment, the search mode sent by the relay server 10 to the database server 20 may also take on the value of a facility classification search in addition to the POI search and the address search in the first embodiment.
(Operation)

The operation of the relay server 10 in the second embodiment is now explained with reference to FIG. 12. The relay server 10 converts the voice data received from the in-vehicle terminal 40 into a string with the voice recognition unit 12, and sends the string, together with the search mode of an address search and a facility classification search, to the database server 20. The relay server 10 determines whether the string corresponds to a geographical keyword, a classification keyword, or an attribute keyword. Subsequently, the relay server 10 sends the search mode as a POI search, as well as the string and the search history 15*a* thereof, to the database server 20, and the database server 20 conducts the search using three keywords, specifically, a geographical keyword, a classification keyword, and an attribute keyword. Nevertheless, in the ensuing explanation of FIG. 12, the conversion of the voice data into a string by the voice recognition unit 12 and the inquiry to the database server 20 in which the search mode is an address search and a facility classification search, are omitted.

FIG. 12 shows the transition of the user's speech, and the search keywords that are sent by the relay server 10 to the database server 20 in the search mode of a POI search. The search keywords are configured from a geographical keyword, a classification keyword, and an attribute keyword, and are updated based on the user's speech. In FIG. 12, time is elapsing from top to bottom, and the user's first speech is "Restaurant", and the user's last speech is "Convenience store".

When the user speaks the word "Restaurant" when there is nothing stored in the search history 15a, the relay server 10 determines that the received data is a facility classification, and sends the search keywords in which the geographical keyword is "Near current location" and the classification keyword is "Restaurant", together with the search mode set as a POI search, to the database server 20.

When the user subsequently speaks the words "○ city", the relay server 10 determines that the received data is a geographical condition. Subsequently, the relay server 10 sends the search keywords configured from "○ city" as the new geographical keyword and "Restaurant" as the same classification keyword, together with the search mode set as a POI search, to the database server 20.

When the user subsequently speaks the words "Open 24 hours", the relay server 10 determines that the received data is a facility attribute. Subsequently, the relay server 10 sends the search keywords configured from "○ city" as the same geographical keyword, "Restaurant" as the same classification keyword, and "Open 24 hours" as the new attribute keyword, together with the search mode set as a POI search, to the database server 20.

When the user subsequently speaks the words "Parking available", the relay server 10 determines that the received data is a facility attribute. Subsequently, the relay server 10 sends the search keywords configured from "○ city" as the same geographical keyword, "Restaurant" as the same classification keyword, and "Parking available" as the new attribute keyword, together with the search mode set as a POI search, to the database server 20.

When the user subsequently speaks the words "Δ city", the relay server 10 determines that the received data is a geographical condition. Subsequently, the relay server 10 sends the search keywords configured from "Δ city" as the new geographical keyword, "Restaurant" as the same classification keyword, and "Parking available" as the same attribute keyword, together with the search mode set as a POI search, to the database server 20.

When the user subsequently speaks the words "Convenience store", the relay server 10 determines that the received data is a facility classification. Subsequently, the relay server 10 sends the search keywords configured from "Δ city" as the same geographical keyword, "Convenience store" as the new classification keyword, and "Parking available" as the same attribute keyword, together with the search mode set as a POI search, to the database server 20.

As explained above, the relay server 10 determines whether the user's spoken voice corresponds to a geographical condition, a facility classification, or a facility attribute, and conducts the search based on a combination of the user's speech and the stored keywords.

(Flowchart of Relay Server)

The operation of the program to be executed by the control unit 11 of the relay server 10 in the search system 1 described above is now explained.

Figure 13:
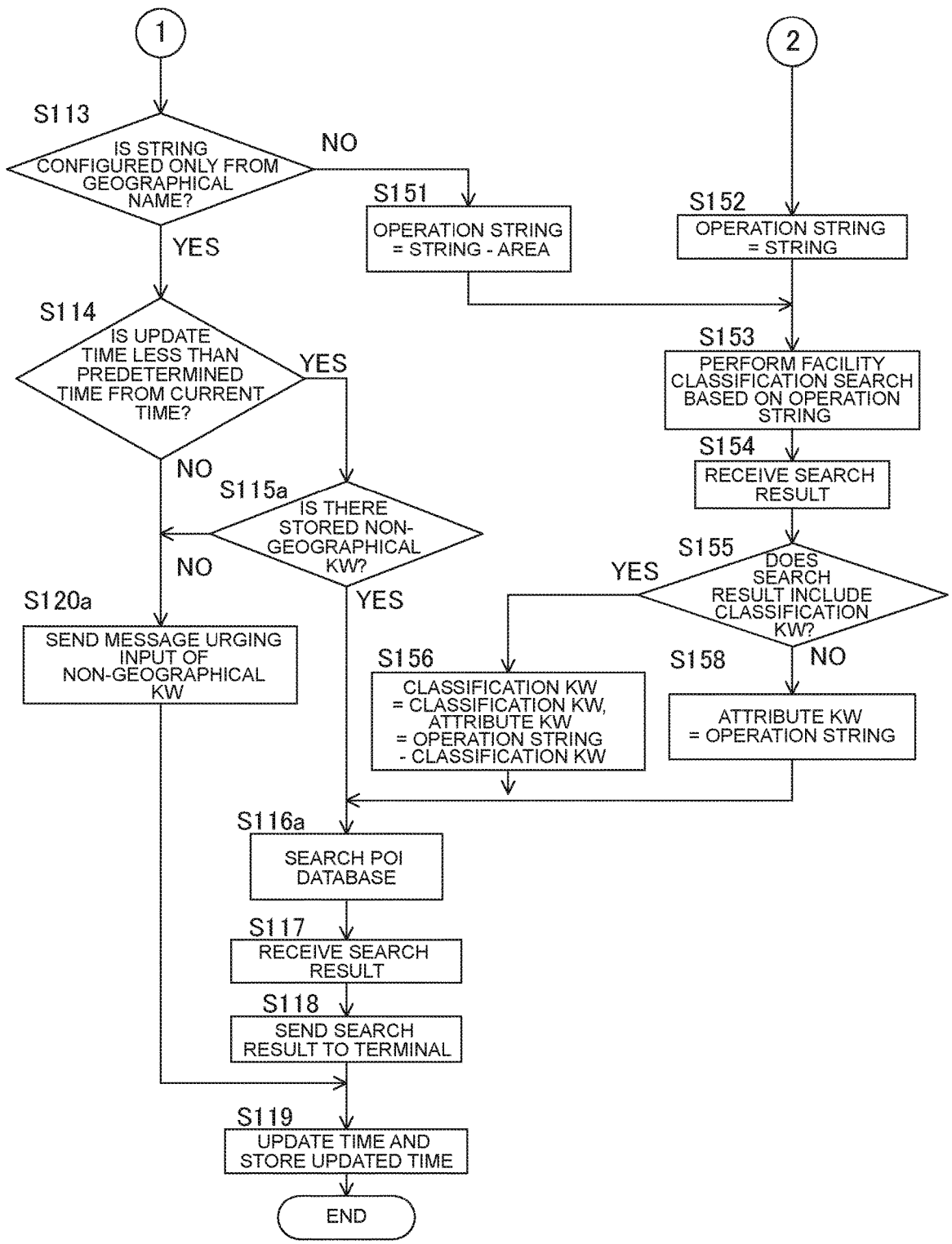
FIG. 13 is the second half of the flowchart showing the operation of the program to be executed by the control unit of the relay server in the second embodiment.

FIG. 6 and FIG. 13 are flowcharts showing the operation of the program to be executed by the control unit 11 of the relay server 10. The control unit 11 executes the program indicated as a flowchart in FIG. 6 each time the communication unit 13 receives a communication from the in-vehicle terminal 40. Since the flowchart shown in FIG. 6 includes numerous processing steps, the second half thereof is shown in FIG. 13. Since FIG. 6 which corresponds to the first half of the flowchart is the same as the first embodiment, the explanation thereof is omitted.

In FIG. 13, encircled number 1 is subsequent to step S109 or step S110 of FIG. 6, and encircled number 1 starts from step S113.

In step S113, the control unit 11 determines whether the converted string is configured only from a geographical keyword or includes a keyword other than a geographical keyword based on the converted string and the search result received in step S104. The control unit 11 proceeds to step S114 upon determining that the converted string is configured only from a geographical keyword, and proceeds to step S151 upon determining that the converted string includes a keyword other than a geographical keyword.

In step S114, the control unit 11 refers to the update data associated with the corresponding in-vehicle terminal ID of the search history 15 and determines whether the time from the update time to the current time is less than a predetermined time. The control unit 11 proceeds to step S115a upon determining that the time from the update time to the current time is less than a predetermined time, and proceeds to step S120a upon determining that a predetermined time or longer has elapsed from the update time. Nevertheless, when data of the corresponding in-vehicle terminal ID is not stored in the search history 15, the control unit 11 proceeds to step S120a as with the case where a predetermined time or longer has elapsed from the update time.

In step S115a, the control unit 11 determines whether or not a non-geographical keyword, such as a classification keyword or an attribute keyword, associated with the corresponding in-vehicle terminal ID is stored as the search history 15. The control unit 11 proceeds to step S116a upon determining that at least either a classification keyword or an attribute keyword is stored, and proceeds to step S120a upon determining that neither a classification keyword nor an attribute keyword is stored.

In step S116a, the control unit 11 sends the search keywords which are stored by being associated with the corresponding in-vehicle terminal ID of the search history 15; that is, the control unit 11 sends the geographical keyword, the classification keyword, and the attribute keyword, and the search mode to the effect that it is a POI search, to the database server 20. The database server 20 searches the POI database based on the received data, and then proceeds to step S117.

While the explanation of step S116a was provided on the premise that the geographical keyword, the classification keyword and the attribute keyword are all stored in the search history 15, if the classification keyword or the attribute keyword is not stored in the search history 15, it is not used in the search.

In step S117, the control unit 11 receives the search result from the database server 20, and then proceeds to step S118.

In step S118, the control unit 11 sends the search result received in step S117 to the in-vehicle terminal 40 having the corresponding in-vehicle terminal ID, and then proceeds to step S119.

In step S119, the control unit 11 updates the update time of the corresponding in-vehicle terminal ID of the search history 15 to the current time, and then ends the flowchart of FIG. 13.

When the current time is a time in which a predetermined time or longer has elapsed from the update time, in step S120a, the control unit 11 sends a message to the in-vehicle terminal 40 having the corresponding in-vehicle terminal ID to urge the in-vehicle terminal 40 to input a non-geographical keyword; that is, to input at least either the classification keyword or the attribute keyword, and then proceeds to step S119.

When the string includes a keyword other than a geographical name, in step S151, the control unit 11 stores a keyword obtained by removing the geographical keyword from the converted string (this is hereinafter referred to as the "operation string") in the storage unit 14, and then proceeds to step S153. For example, when the converted string is "B, Restaurant" and the geographical keyword of the corresponding in-vehicle terminal ID of the search history 15 is "B", the operation string is "Restaurant".

In FIG. 13, encircled number 2 is subsequent to step S123 or step S125 of FIG. 6, and encircled number 2 starts from step S152.

In step S152, the control unit 11 decides to thereafter refer to the converted string as the "operation string" for the subsequent processing, and then proceeds to step S153.

In step S153, the control unit 11 sends the operation string and the search mode to the effect that it is a facility classification search to the database server 20, and then proceeds to step S154.

When a classification keyword is included in the received operation string, the database server 20 sends the classification keyword, and, when a classification keyword is not included in the operation string, the database server 20 sends "Not applicable".

In step S154, the control unit 11 receives the search result from the database server 20, and then proceeds to step S155.

In step S155, the control unit 11 determines whether the operation string includes a classification keyword such as the facility name based on the search result received in step S154. The control unit proceeds to step S156 upon determining that a classification keyword is included, and proceeds to step S158 upon determining that a classification keyword is not included.

In step S156, the control unit 11 stores the received classification keyword as the classification keyword of the search history 15a, and stores a keyword obtained by removing the classification keyword from the operation string as the attribute keyword of the search history 15a. Nevertheless, when the operation string is configured only from the classification keyword, the attribute keyword of the search history 15a is not changed. The control unit 11 thereafter proceeds to step S116a.

In step S158, the control unit 11 stores the operation string as the attribute keyword of the search history 15a, and then proceeds to step S116a.

(Flowchart of Database Server)

The program to be executed by the control unit 21 of the database server 20 is now explained.

Figure 14:
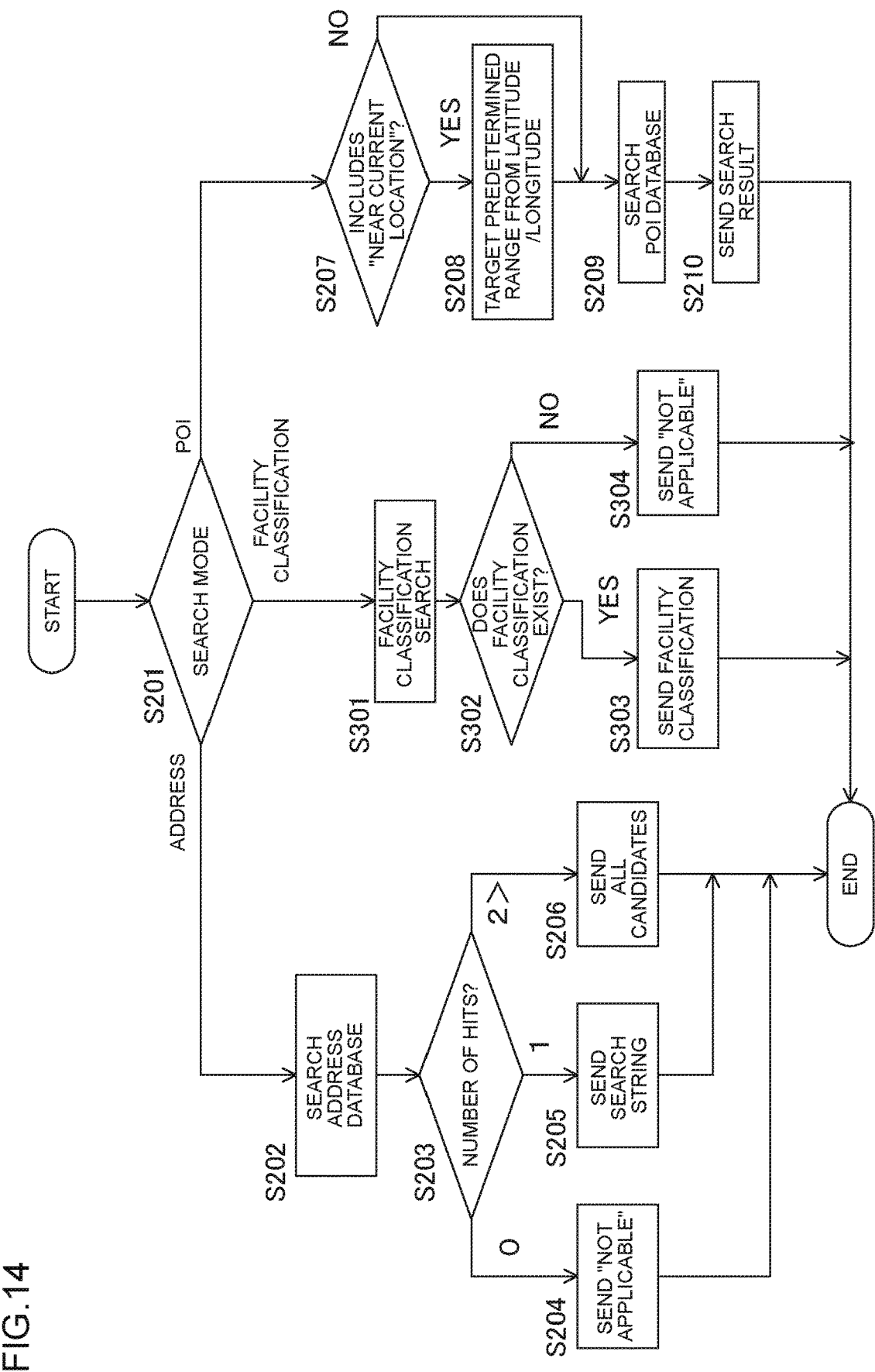
FIG. 14 is a flowchart showing the operation of a program to be executed by a control unit of a database server in the second embodiment.

The program which executes the routine indicated as a flowchart in the FIG. 14 shows the processing routine to be executed when the control unit 21 of the database server 20 receives data from the relay server 10 in the second embodiment in substitute for the program which executes the routine indicated as a flowchart in FIG. 8 in the first embodiment.

In step S201, the control unit 21 reads the search mode from the received data, and proceeds to step S202 upon determining that the search mode is an address search, proceeds to step S207 upon determining that the search mode is a POI search, and proceeds to step S301 upon determining that the search mode is a facility classification search. Since the processing upon proceeding to step S202 and step S207 is the same as the first embodiment, the explanation thereof is omitted.

In step S301, the control unit 21 searches the facility classification database 25 based on the received string, and then proceeds to step S302.

In step S302, the control unit 21 determines whether the received string includes any facility classification based on the search conducted in step S301. The control unit 21 proceeds to step S303 upon determining that a facility classification is included, and proceeds to step S304 upon determining that a facility classification is not included.

In step S303, the control unit 21 sends the corresponding facility classification to the relay server 10, and then ends the flowchart of FIG. 14. For example, in cases where the facility classification database 25 is the example shown in FIG. 11, and the received string is "Convenience store, Parking available", "Convenience store" is sent to the relay server 10.

In step S304, the control unit 21 sends a message to the relay server 10 to the effect that there is no corresponding facility classification, and then ends the flowchart of FIG. 14.

(Summary of Operations)

In the second embodiment, the search system 1 performs the following operations in addition to the operations of the first embodiment.

The relay server 10 converts the received voice data into a string with the voice recognition unit 12, and, upon using the address database 22 of the database server 20 and determining that the string is a geographical condition, stores the string as a geographical keyword. When the relay server 10 determines that the string is not a geographical condition, the relay server 10 uses the facility classification database 25 and determines whether the string is a facility classification, and then stores the string as a classification keyword or an attribute keyword. In other words, the string is classified as a geographical condition, a facility classification, or a facility attribute, and the string is stored in the search history 15 as a geographical keyword, a classification keyword, or an attribute keyword according to the foregoing classification. The POI database 23 is searched using the search history 15.

The following effects can be yielded according to the embodiment described above.

(1) A non-geographical keyword is configured from a classification keyword as a search keyword indicating a facility classification condition and an attribute keyword as a search keyword indicating a facility attribute condition. When the control unit 11 of the relay server 10 determines that the string is not a geographical condition based on the search result of the address database 22, the control unit 11 searches the POI database 23 and determines whether the string corresponds to a facility classification or a facility attribute. When a geographical keyword, a classification keyword, and an attribute keyword are stored in the storage unit 14 and the control unit 11 determines that the string is a facility classification, the control unit 11 searches the POI database based on that string, the stored geographical condition, and the stored facility attribute, and stores that string as a classification keyword in the storage unit 14. When the control unit 11 determines that the string is a facility attribute, the control unit 11 searches the POI database based on that string, the stored geographical condition, and the stored facility classification, and stores that string as an attribute keyword in the storage unit 14.

According to the foregoing search system 1, the POI database 23 can be searched based on a geographical keyword, a classification keyword, and an attribute keyword by using the user's previous speech and the user's new speech.

Modified Example 1

In the first embodiment, the search history 15 stored two keywords indicating a geographical condition and a non-geographical condition, and in the second embodiment, the search history 15*a* stores three keywords indicating a geographical condition, a facility category condition, and a facility attribute condition. The number of keywords to be stored in the search history and the number of keywords to be used in the search of the POI database 23 are not limited thereto. The facility attribute condition may be subdivided and the POI database 23 may also be searched by using four or more conditions. Moreover, the conditions to be used in the search do not need to include a geographical condition and a facility category condition.

For example, in the second embodiment, store hours, parking, store holiday, non-smoking, and credit card that are classified as facility attributes may be used as individual conditions, and the keywords indicating these conditions may be stored in the search history 15 and used in the search of the POI database 23. Furthermore, in order to delete a condition to be used in the search, a specific term; for instance, "Ignore" or the like may also be defined.

FIG. 15 shows a transition diagram of the user's speech and the search conditions sent by the relay server 10 to the database server 20 in the case of using 7 keywords indicating geographical condition, facility classification, store hours, parking, store holiday, non-smoking, and credit card in the search. An item in which the condition may be overlooked in FIG. 15; that is, an item that does not need to be used in the search, is indicated as "–".

When the user foremost speaks the word "Restaurant", the relay server 10 determines that the received data is a facility classification, and sends the search keywords database server 20 in which the geographical keyword is "Near current location", and the classification keyword is "Restaurant".

When the user subsequently speaks the words "○ city", the relay server 10 determines that the received data is a geographical condition. Subsequently, the relay server 10 sends the search keywords configured from "○ city" as the geographical keyword, and "Restaurant" as the non-geographical keyword, to the database server 20.

When the user subsequently speaks the words "Parking available", the relay server 10 determines that the received data is a condition that is related to parking. Subsequently, the relay server 10 sends the search keywords configured from "○ city" as the geographical keyword, "Restaurant" as the non-geographical keyword, and "Parking available" as a keyword indicating a condition that is related to parking, to the database server 20.

When the user subsequently speaks the words "Smoke-free", the relay server 10 determines that the received data is a condition that is related to non-smoking. Subsequently, the relay server 10 sends the search keywords configured from "○ city" as the geographical keyword, "Restaurant" as the non-geographical keyword, "Parking available" as a keyword indicating a condition that is related to parking, and "Smoke-free" as a keyword indicating a condition that is related to non-smoking, to the database server 20.

When the user subsequently speaks the words "Open every day", the relay server 10 determines that the received data is a condition that is related to store holidays. The relay server 10 adds "Open every day" as a keyword indicating a condition that is related to store holidays to the foregoing search keywords, and sends the result to the database server 20.

When the user subsequently speaks the words "Ignore parking", the relay server 10 determines that the received data is indicating that the keyword indicating a condition that is related to parking should be deleted. The relay server 10 deletes the condition related to parking from the foregoing search keywords, and sends the result to the database server 20.

When the user subsequently speaks the words "Open 24 hours", the relay server 10 determines that the received data is a condition related to store hours. The relay server 10 adds "Open 24 hours" as a keyword indicating a condition that is related to store hours to the foregoing search keywords, and sends the result to the database server 20.

When the user subsequently speaks the word "Cafe", the relay server 10 determines that the received data is a condition related to a facility classification. The relay server 10 changes "Restaurant" as a keyword indicating a condition that is related to a facility classification in the foregoing search keywords to "Cafe", and sends the result to the database server 20.

When the user subsequently speaks the words "Non-smoking section", the relay server 10 determines that the received data is a condition related to non-smoking. The relay server 10 changes "Smoke-free" as a keyword indicating a condition that is related to non-smoking in the foregoing search keywords to "Non-smoking section", and sends the result to the database server 20.

According to this modified example 1, the POI database 23 can be searched by combining a plurality of facility attributes as search conditions.

Modified Example 2

In the foregoing embodiments, the in-vehicle terminal 40 could not be directly connected to the public network X, and used the so-called tethering function of the portable terminal 30, but the communication configuration of the in-vehicle terminal 40 is not limited thereto. The in-vehicle terminal 40 may also comprise a communication unit that can be connected to the public network X, and communicate with the relay server 10 without going through the portable terminal 30.

In the foregoing embodiments, the in-vehicle terminal 40 transferred the voice data input from the voice input unit 44 to the relay server 10, and the voice data was converted into a string with the voice recognition unit 12 of the relay server 10, but the functions of the in-vehicle terminal 40 are not limited thereto. The in-vehicle terminal 40 may also comprise a voice recognition unit and independently convert the input voice data into a string and then send the string to the relay server 10.

Modified Example 3

In the foregoing embodiments, the in-vehicle terminal 40 sent the voice data, the in-vehicle terminal ID, and the current location information to the relay server 10, but the data to be sent to the relay server 10 is not limited thereto.

For example, the latitude and the longitude of the travel destination (this is hereinafter referred to as the "destination") set in the in-vehicle terminal 40 may also be sent. Furthermore, the relay server 10 may also send the latitude/longitude of the destination upon sending the current location to the database server 20, and the database server 20 may use the latitude/longitude of the destination received from the relay server 10 in substitute for "Near destination" in the POI search.

Modified Example 4

In the foregoing embodiments, the search keywords stored in the search history 15 were referenced only when the update time of the search history of the corresponding in-vehicle terminal ID stored in the search history 15 was less than a predetermined time from the current time, but the condition of referring to the search keywords is not limited thereto. The search keywords may be referenced irrespective of the update time, or the search keywords may be constantly referenced without storing the update time.

Modified Example 5

In the second embodiment, the database server 20 included a facility classification database 25, but the database server 20 does not need to include a facility classification database 25.

When the search mode is a facility classification search, the control unit 21 may acquire a list of facility classifications from all POI data stored in the POI database 23, and use the acquired list for the search in substitute for the facility classification database 25.

According to this modified example 5, it is possible to reduce the number of databases equipped in the database server 20.

Each of the foregoing embodiments and modified examples may also be respectively combined.

While various embodiments and modified examples were explained above, the present invention is not limited to the subject matter thereof. Other modes considered to fall within the technical scope of the present invention are also covered by the scope of the present invention.

The disclosure of the following priority application is incorporated herein by reference.

Japanese Patent Application No. 209190 of 2014 (filed on Oct. 10, 2014)

REFERENCE SIGNS LIST

1 . . . Search system
10 . . . Relay server
11 . . . Control unit
12 . . . Voice recognition unit
13 . . . Communication unit
14 . . . Storage unit
15 . . . Search history
15a . . . Search history
20 . . . Database server
21 . . . Control unit
22 . . . Address database
23 . . . POI database
24 . . . Communication unit
25 . . . Facility classification database
30 . . . Portable terminal
40 . . . In-vehicle terminal
41 . . . Control unit
42 . . . Display unit
43 . . . Operation input unit
44 . . . Voice input unit
45 . . . Voice output unit
46 . . . Short-range wireless communication unit
47 . . . Storage unit
48 . . . Location detection unit

The invention claimed is:

1. A search system comprising:
a database server comprising an address database and a POI database;
an in-vehicle terminal comprising a voice input unit; and
a relay server which sends and receives various data by performing communication between the database server and the in-vehicle terminal, wherein the relay server comprises:
a voice recognition unit which converts a voice of a speech input to the voice input unit of the in-vehicle terminal into a data string;
a storage unit which stores a geographical keyword and a non-geographical keyword; and
a control unit which searches the POI database by using a combination of the geographical keyword and the non-geographical keyword stored in the storage unit, and sends a search result to the in-vehicle terminal,
wherein, in a state where the geographical keyword and the non-geographical keyword are stored in the storage unit, the control unit of the relay server first searches the address database and determines whether or not the data string converted by the voice recognition unit includes a geographical keyword and, upon determining that the data string includes the geographical keyword, updates the geographical keyword stored in the storage unit with the data string, searches the POI database based on the updated geographical keyword and the already stored non-geographical keyword in the storage unit, and, upon determining that the data string does not include a geographical keyword, updates the non-geographical keyword stored in the storage unit with the data string and the POI database based on the updated non-geographical keyword and the already stored geographical keyword.

2. The search system according to claim 1, wherein the in-vehicle terminal further comprises a location detection unit which calculates a current location, and
wherein, upon storing the geographical keyword and the non-geographical keyword in the storage unit, the control unit of the relay server stores a time of storage as a last recording time in the storage unit, and when the last recording time is earlier than the current time by a predetermined time,_ or longer than the predetermined time in cases of using the geographical condition stored in the storage unit for searching the POI database, uses the current location received from the in-vehicle terminal as the geographical keyword instead of the geographical keyword stored in the storage unit.

3. The search system according to claim 1,
wherein the non-geographical keyword is configured from a classification keyword and an attribute keyword,
wherein, when the control unit of the relay server determines that the data string is not a geographical condition based on the search result of the address database, the control unit searches the POI database and determines whether the data string corresponds to a facility classification or a facility attribute, and
wherein, in a state where the geographical keyword, the classification keyword and the attribute keyword are stored in the storage unit:
a) when the control unit determines that the data string is the facility classification, the control unit updates the classification keyword stored in the storage unit with the data string and searches the POI database based on the updated classification keyword, the stored geographical keyword and the stored attribute keyword, and
b) when the control unit determines that the data string is the facility attribute, the control unit updates the classification keyword stored in the storage unit with the data string and searches the POI database based on the updated attribute keyword, the stored geographical keyword and the stored classification keyword.

4. The search system according to claim 1, wherein, when the control unit of the relay server determines that the data string includes a plurality of geographical keywords, the control unit sends the plurality of geographical keywords to the in-vehicle terminal and receives one of the plurality of geographical keywords from the in-vehicle terminal, stores the received geographical keyword in the storage unit.

5. The search system according to claim 1, wherein, upon storing the geographical keyword stored in the storage unit, the already stored geographical keyword in the storage unit is deleted, and upon storing the non-geographical keyword in the storage unit, the non-geographical keyword previously stored in the storage unit is deleted.

6. The search system according to claim 3, wherein, upon storing the geographical keyword in the storage unit, the already stored geographical keyword in the storage unit is deleted, and upon storing the classification keyword in the storage unit, the classification keyword previously stored in the storage unit is deleted, and upon storing the attribute keyword in the storage unit, the attribute keyword previously stored in the storage unit is deleted.

\* \* \* \* \*

UNITED STATES PATENT AND TRADEMARK OFFICE
CERTIFICATE OF CORRECTION

PATENT NO. : 10,514,268 B2  
APPLICATION NO. : 15/516868  
DATED : December 24, 2019  
INVENTOR(S) : Takashi Yamaguchi Page 1 of 1

It is certified that error appears in the above-identified patent and that said Letters Patent is hereby corrected as shown below:

In the Claims

Column 22, Line 28, Claim 1    delete "the" and insert -- searches the --

Column 22, Line 39, Claim 2    delete "time,_" and insert -- time, --

Signed and Sealed this  
Twelfth Day of January, 2021

Andrei Iancu  
*Director of the United States Patent and Trademark Office*